United States Patent
Zhu (10) Patent No.: US 7,739,440 B2
(45) Date of Patent: Jun. 15, 2010

(54) ATA HDD INTERFACE FOR PERSONAL MEDIA PLAYER WITH INCREASED DATA TRANSFER THROUGHPUT

(75) Inventor: Xiaoming Zhu, Coppell, TX (US)

(73) Assignee: Texas Instruments Incorporated, Dallas, TX (US)

( * ) Notice: Subject to any disclaimer, the term of this patent is extended or adjusted under 35 U.S.C. 154(b) by 272 days.

(21) Appl. No.: 11/839,880

(22) Filed: Aug. 16, 2007

(65) Prior Publication Data

US 2009/0049209 A1 Feb. 19, 2009

(51) Int. Cl.
*G06F 13/14* (2006.01)
*G06F 13/12* (2006.01)

(52) U.S. Cl. .................... 710/305; 710/23; 710/62; 710/72; 710/74; 710/313; 710/315; 370/465; 370/466; 370/467; 713/501; 713/502

(58) Field of Classification Search .......... 710/23, 710/62, 72, 74, 305, 313, 315; 370/465, 370/466, 467; 713/501, 502
See application file for complete search history.

(56) References Cited

U.S. PATENT DOCUMENTS

| | | | | |
|---|---|---|---|---|
| 4,989,113 | A * | 1/1991 | Asal | 710/22 |
| 5,594,926 | A * | 1/1997 | Chang et al. | 710/52 |
| 5,625,847 | A * | 4/1997 | Ando et al. | 710/60 |
| 5,732,250 | A * | 3/1998 | Bates et al. | 713/600 |
| 6,477,596 | B2 * | 11/2002 | Miura et al. | 710/107 |
| 6,567,881 | B1 * | 5/2003 | Mojaver et al. | 710/313 |
| 6,748,457 | B2 * | 6/2004 | Fallon et al. | 710/2 |
| 6,754,733 | B2 * | 6/2004 | Hansen | 710/22 |
| 7,376,772 | B2 * | 5/2008 | Fallon | 710/68 |
| 7,571,266 | B2 * | 8/2009 | Carlson | 710/62 |
| 2002/0085835 | A1 * | 7/2002 | Zhang et al. | 386/124 |
| 2004/0243984 | A1 * | 12/2004 | Vorbach et al. | 717/136 |
| 2004/0249880 | A1 * | 12/2004 | Vorbach | 709/200 |
| 2006/0069884 | A1 * | 3/2006 | Kim et al. | 711/154 |
| 2006/0271739 | A1 * | 11/2006 | Tsai et al. | 711/123 |
| 2007/0079015 | A1 * | 4/2007 | Royer et al. | 710/5 |
| 2007/0239908 | A1 * | 10/2007 | Carlson | 710/62 |
| 2008/0040518 | A1 * | 2/2008 | Yoon | 710/23 |
| 2008/0317441 | A1 * | 12/2008 | Calhoon et al. | 386/124 |
| 2009/0198860 | A1 * | 8/2009 | Pan et al. | 710/313 |

OTHER PUBLICATIONS

'Embedded Microprocessor Systems Design' by Kenneth L. Short, copyright 1998 by Prentice-Hall, Inc.*

(Continued)

*Primary Examiner*—Henry W. H. Tsai
*Assistant Examiner*—Steven G Snyder
(74) *Attorney, Agent, or Firm*—Robert D. Marshall, Jr.; W. James Brady; Frederick J. Telecky, Jr.

(57) ABSTRACT

This invention is a method allowing for interfacing high speed hard disk drives (ATA-HDD) in high throughput PIO modes to currently available digital media processors (DMP). The prescribed interface programs signals available in the DMP external memory interface (EMIF) functions to match the requirements of ATA-HDD PIO functions. Selected signal redefinition and minimal glue logic is employed to form a seamless link between the EMIF I/O of the digital media processor DMP and the ATA-HDD hard drive.

4 Claims, 9 Drawing Sheets

OTHER PUBLICATIONS

'Working Draft, Information Technology—AT Attachment Interface with Extensions (ATA-2)' Revision 4c, Mar. 18, 1996.*

'What is PIO?' from http://bugclub.org/beginners/hardware/pio.html.*

'TMS320VC5503/5507/5509 DSP External Memory Interface (EMIF) Reference Guide' by Texas Instruments, copyright 2004.*

'Connecting the Intel PXA27x Processor Family to a Hard-Disk Drive via the VLIO Memory Interface Application Note' by Intel, Oct. 2005.*

'QuickLogic QuickIDE Bridge User Manual—Supporting the Intel PXA27x Processor Family' Revision B, copyright 2006, QuickLogic Corporation.*

* cited by examiner

| ADDRESS TABLE FOR ATA-HDD I/O REGISTERS | | | | | | EMIF BITS A[4:0] TO ADDRESS ATA-HDD I/O REGISTERS | | | | |
|---|---|---|---|---|---|---|---|---|---|---|
| REGISTER ADDRESSED | CS1 | CS0 | DA2 | DA1 | DA0 | A4 | A3 | A2 | A1 | A0 |
| DATA REGISTER 407 | 1 | 0 | 0 | 0 | 0 | 1 | 0 | 0 | 0 | 0 |
| ERROR REGISTER 412 | 1 | 0 | 0 | 0 | 1 | 1 | 0 | 0 | 0 | 1 |
| SECTOR COUNT REGISTER 410 | 1 | 0 | 0 | 1 | 0 | 1 | 0 | 0 | 1 | 0 |
| SECTOR NUMBER REGISTER 408 | 1 | 0 | 0 | 1 | 1 | 1 | 0 | 0 | 1 | 1 |
| CYLINDER LOW REGISTER 406 | 1 | 0 | 1 | 0 | 0 | 1 | 0 | 1 | 0 | 0 |
| CYLINDER HIGH REGISTER 405 | 1 | 0 | 1 | 0 | 1 | 1 | 0 | 1 | 0 | 1 |
| DEVICE HEAD REGISTER 409 | 1 | 0 | 1 | 1 | 0 | 1 | 0 | 1 | 1 | 0 |
| STATUS REGISTERS 403/404 | 1 | 0 | 1 | 1 | 1 | 1 | 0 | 1 | 1 | 1 |
| DEVICE CONTROL/ALT STATUS REGISTER 401/402 | 0 | 1 | 1 | 1 | 0 | 0 | 1 | 1 | 1 | 0 |

ATA HDD INTERFACE FOR PERSONAL MEDIA PLAYER WITH INCREASED DATA TRANSFER THROUGHPUT

TECHNICAL FIELD OF THE INVENTION

The technical field of this invention is personal media players.

BACKGROUND OF THE INVENTION

A variety of Texas Instruments digital media processors have been developed for digital cameras and the digital media players. These processors are designed for products requiring high data transfer throughput including portable media players (PMP).

One of the major functions of PMP is to play movies requiring mass storage in hard drives of extremely small physical size. The movie playback frame rate and resolution both depend on a high level of data transfer throughput between the PMP and the hard drive it accesses.

Digital movie data in portable media players is generally compressed in an MPEG4 format and utilizes mass storage in the range of many gigabytes. The movie playback frame rate and resolution depend on how effectively the processor can respond to data coming from the hard drive. Playback quality is a direct function of the level of throughput that the PMP player and its storage medium can offer.

Integrated Drive Electronics (IDE) was created as a way to standardize the use of hard drives in computers with the hard drive and the controller combined. The controller is a small circuit board with semiconductor chips that guide how the hard drive stores and accesses data. Most controllers also include some memory that acts as a buffer to enhance hard drive performance.

Before IDE, controllers and hard drives were separate and often proprietary. Thus, a controller from one manufacturer might not operate properly with a hard drive from another manufacturer. The distance between the controller and the hard drive could result in poor signal quality and affect performance. IBM introduced the AT computer in 1984 with a several key innovations.

1. Additional slots in the computer for adding cards used a new version of the Industry Standard Architecture (ISA) bus. The new bus was capable of transmitting information 16 bits at a time, compared to 8 bits on the original ISA bus.

2. A hard drive designed for the AT computer was introduced using a new combined drive/controller. A ribbon cable from the drive/controller combination ran to an ISA card to connect to the computer, giving birth to the AT Attachment (ATA) interface.

3. In 1986 ATA standard drives were introduced. This drive/controller combination was based on the ATA standard developed by IBM. Vendors then began offering IDE drives. IDE became the term that covered the entire range of integrated drive/controller devices. Since almost all IDE drives are ATA-based, the two terms are used interchangeably.

Currently, an IDE hard disk may be configured to work in one of the five programmable I/O modes with a range of corresponding data transfer rates. Table 1 summarizes the mode designations of the five currently identified programmable I/O modes and their transfer rates.

TABLE 1

| PIO Mode | Data Rate (Mbytes/sec) | Access Rate (nsec/access) |
|---|---|---|
| PIO-0 | 3.3 | 606 |
| PIO-1 | 5.2 | 385 |
| PIO-2 | 8.3 | 240 |
| PIO-3 | 11.1 | 180 |
| PIO-4 | 16.6 | 120 |

The host digital media processor negotiates the desired data transfer rate with the IDE hard disk during initialization depending on the capability of the hard disk. Older hard disk drives may accommodate only one of the lower programmable I/O modes, but many newer hard disks can support all the transfer rates of Table 1. Likewise slower processors cannot access hard disks at the higher programmable I/O modes.

Figure 1:
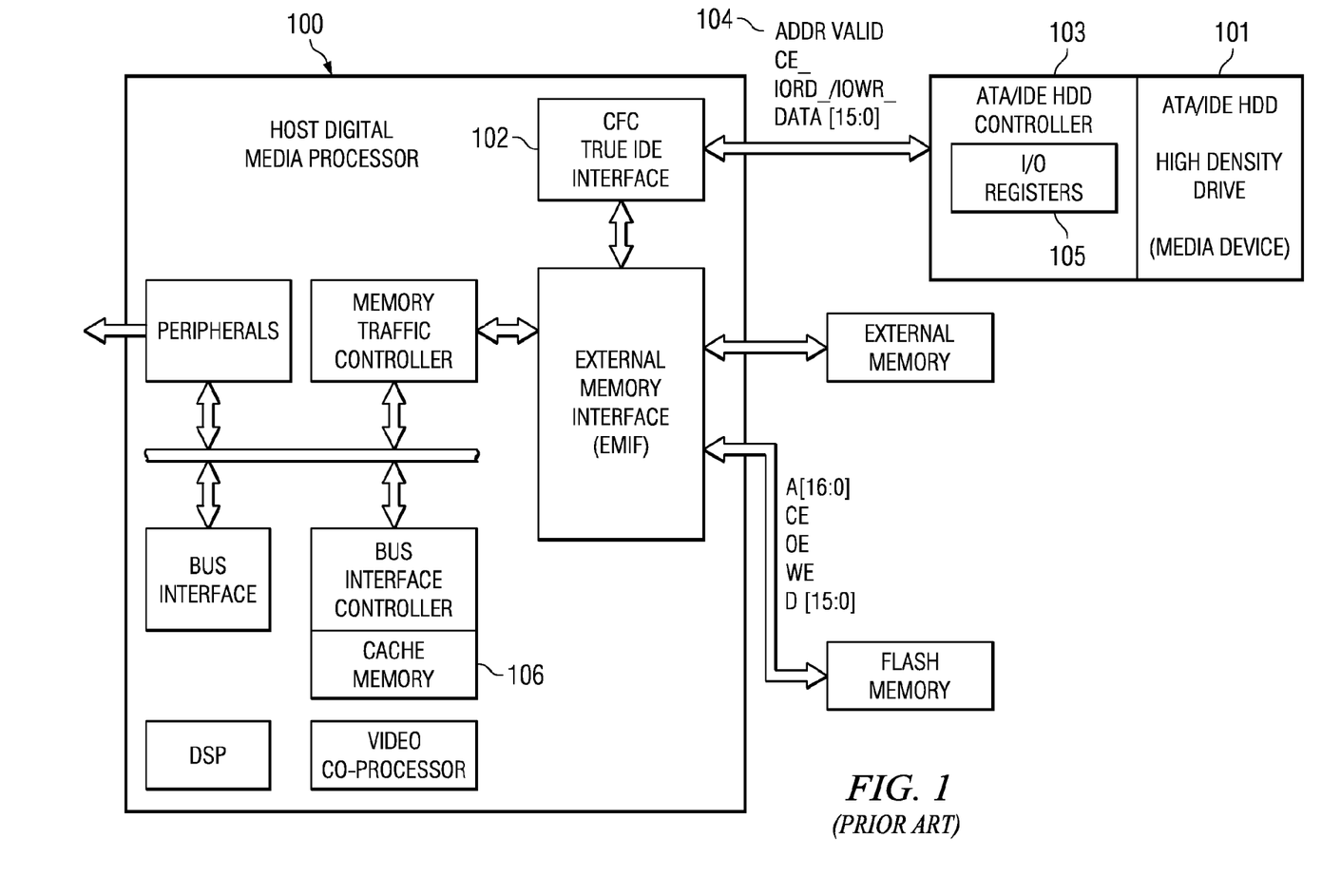
FIG. 1 illustrates the block diagram of a digital media processor (DMP) and its interface to an ATA/HDD high density hard drive via a compact flash card interface (CFC) built into the digital media processor chip (Prior Art)

FIG. 1 illustrates a block diagram of a host digital media processor (DMP) 100 and its interface in Prior Art to an ATA/IDE high-density drive media device 101 via a CFC True IDE Mode interface 102 built into the digital media processor 100. The ATA-IDE HDD controller 103 is shown separately to emphasize the presence of I/O registers crucial to HDD operation. Compact Flash Association specification rev. 1.4 dated 1998 defines the compact flash card (CFC), which allows for three major modes of usage: PC Card Memory Mode; PC Card I/O Mode; and CFC True IDE Mode.

The CFC True IDE Mode interface 102 built in to the digital media processor chip supports CFC card data transfers where each read or write access to the hard disk takes typically 255 nsec per word (slower than the programmable I/O-2 mode). Thus the use of the CFC True IDE interface requires that the digital media processor must set the hard disk to work at programmable I/O-1 mode rate where maximum throughput is 5.2 Mbytes per second. In CFC True IDE Mode, CFC True IDE interface 102 uses signals 104 derived from the DMP processor to drive the ATA/IDE HDD high density drive 101. Table 2 lists the signals for read cycle timing.

TABLE 2

| Item | Symbol | Min nsec | Max nsec |
|---|---|---|---|
| Data delay after IORD_ (212) | tDdRD_ | | 100 |
| Data hold following IORD_ (211) | tDhRD | 0 | |
| IORD_ width (208) | twRD | 165 | |
| Address setup before IORD_ (205) | tAsuRD | 70 | |
| Address hold after IORD_ (206) | tAhRD | 20 | |
| CE_ setup before IORD_ (207) | tCEsuRD | 5 | |
| CE_ hold following IORD_ (209) | tCEhRD | 20 | |

Figure 2:
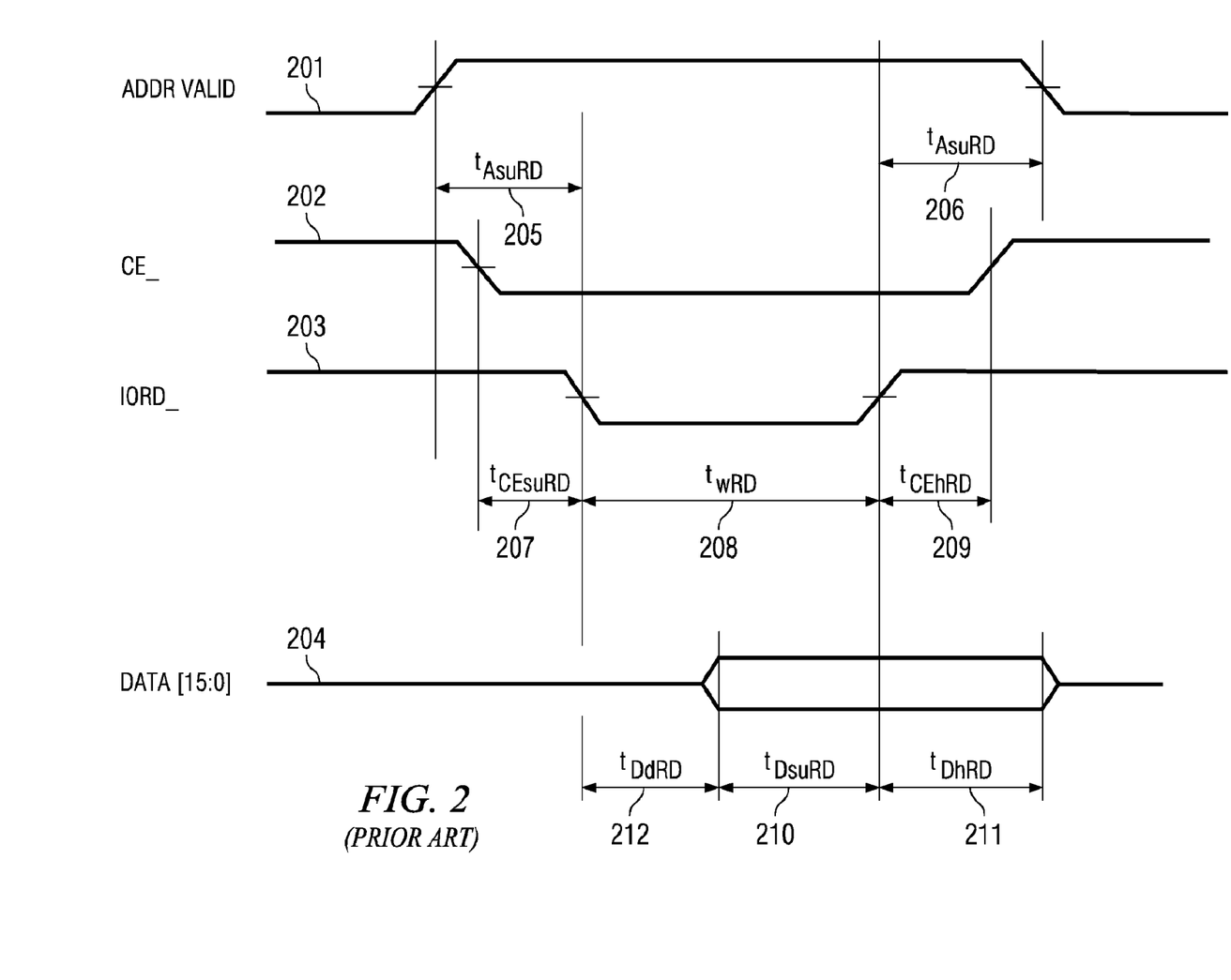
FIG. 2 illustrates the timing diagram for read functionality requirements of the ATA-IDE controller and the interface between the CFC flash card interface to an ATA/HDD high density hard drive (Prior Art)

FIG. 2 illustrates descriptive waveforms of the read signals. These read signals include:

ADDR_valid (201) defines the time window for which addressing is valid;

CE_ 202 is a chip enable signal for read operations and is active low;

IORD_ 203 determines duration of READ cycle and is active low;

Data[15:0] 204 defines data read interval;

tAsuRD 205 is the address setup time prior to IORD_;

tAhRD 206 is the address hold after IORD_;

tCEsuRD 207 is the chip enable setup time prior to leading edge of IORD_;

twRD 208 is the pulse width of IORD_;

tCEhRD 209 is the chip enable hold time after trailing edge of IORD_;

tDsuRD 210 is the data setup time prior to trailing edge of IORD_;

tDhRD 211 is the data hold time after trailing edge of IORD_; and tDdRD 212 is the data delay time after leading edge of IORD_.

Table 3 lists the signals for write cycle timing.

TABLE 3

| Item | Symbol | Min nsec | Max nsec |
|---|---|---|---|
| Data delay after IOWR_ (312) | tDdWR_ | | 60 |
| Data hold following IOWR_ (311) | tDhWR | 30 | |
| IOWR_ width (308) | twWR | 165 | |
| Address setup before IOWR_ (305) | tAsuWR | 70 | |
| Address hold after IOWR_ (306) | tAhWR | 20 | |
| CE_ setup before IOWR_ (307) | tCEsuWR | 5 | |
| CE_ hold following IOWR_ (309) | tCEhWR | 20 | |

Figure 3:
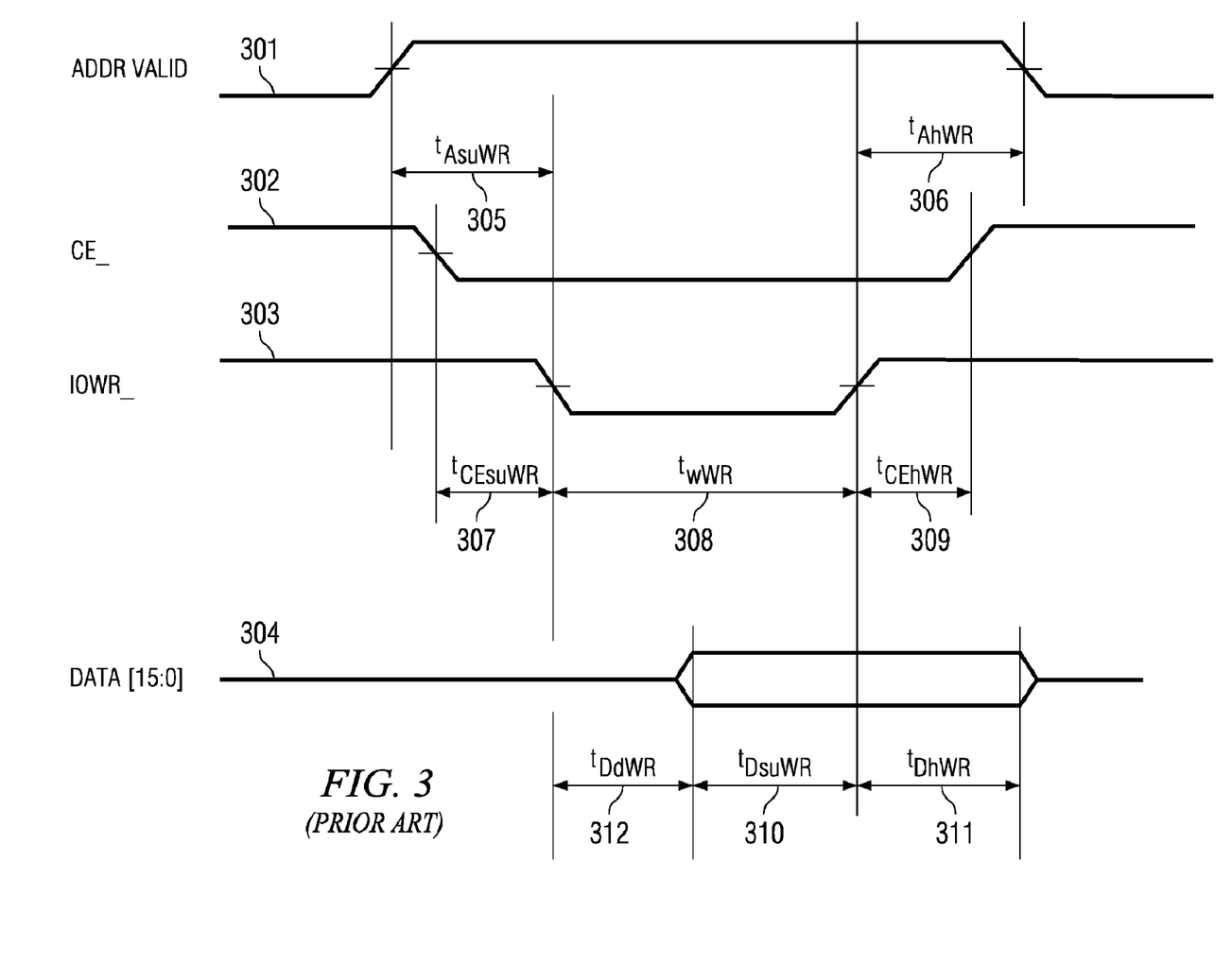
FIG. 3 illustrates the timing diagram for write functionality requirements of the ATA-IDE controller and the interface between the CFC flash card interface to an ATA/HDD high density hard drive (Prior Art)

FIG. 3 illustrates descriptive waveforms of the write signals. These write signals include:

ADDR_valid 301 defines the time window for which addressing is valid;

CE_ 302 is the chip enable signal for write operations and is active low;

IOWR_ 303 determines the duration of a WRITE cycle and is active low;

Data[15:0] 304 defines the data write interval;

tAsuWR 305 is the address setup time prior to IOWR_;

tAhWR 306 is the address hold after IOWR_;

tCEsuWR 307 is the chip enable setup time prior to leading edge of IOWR_;

twWR 308 is the pulse width of IOWR_;

tCEhWR 309 is the chip enable hold time after trailing edge of IOWR_;

tDsuWR 310 is the data setup time prior to trailing edge of IOWR_;

tDsuWR 311 is the data hold time after trailing edge of IOWR_; and tDdWR 312 is the data delay time after leading edge of IOWR_.

Figure 4:
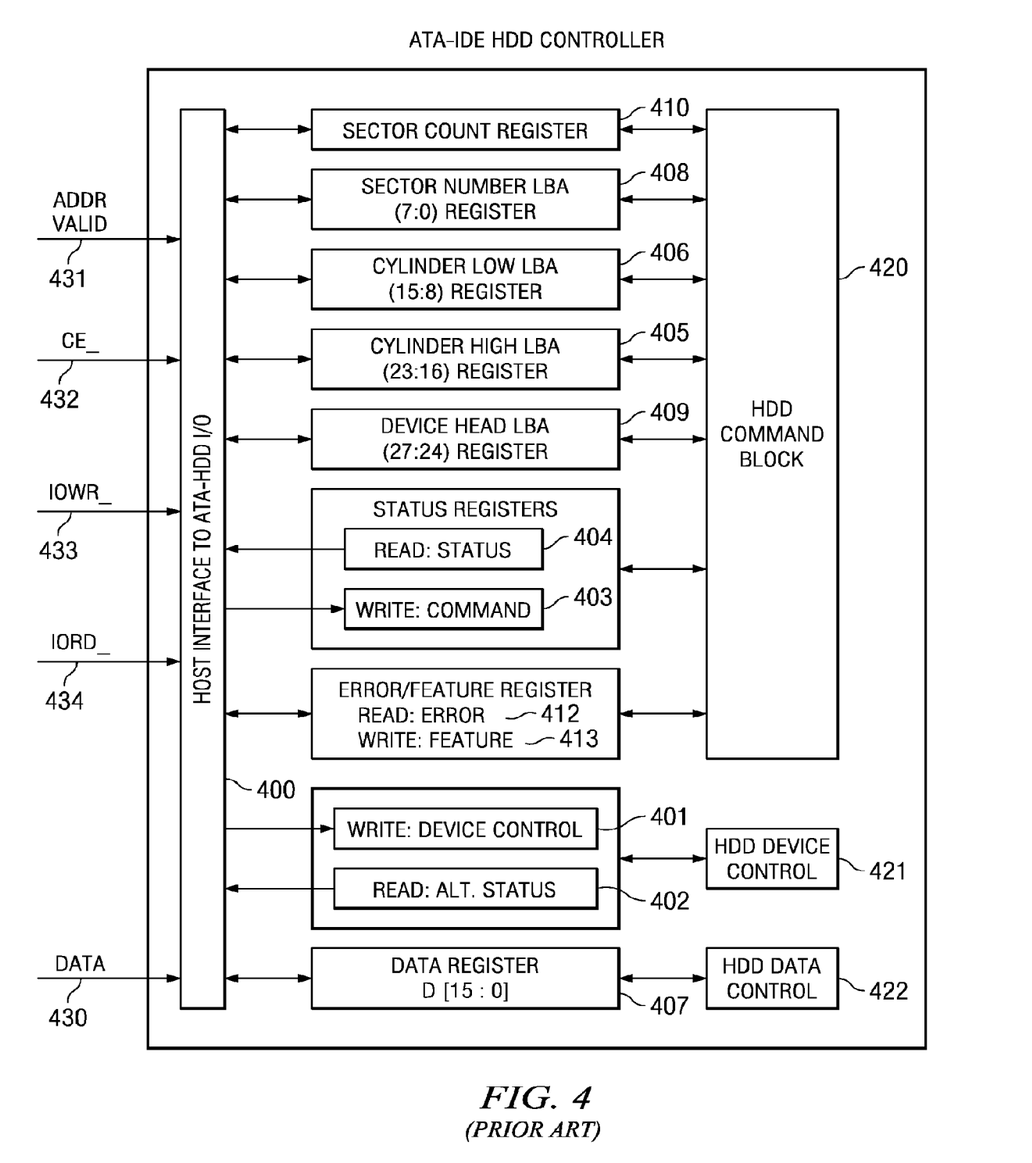
FIG. 4 illustrates the ATA-HDD controller and associated registers for interfacing EMIF addressing and control signals to the HDD I/O registers (Prior Art)

FIG. 4 illustrates the ATA/IDE HDD controller 103 and associated registers 105 for extended memory interface (EMIF) addressing and control signals to the HDD I/O registers 105 of the prior art. Two types of data are involved in the HDD operation: (a) control data to direct operation from the HDD registers 105; and (b) information data to be stored. In initial operation of any read/write cycle, control data is transferred from the host to the HDD controller addressable registers 401 through 410. Then the ATA/IDE HDD controller 103 performs all of the operations necessary to properly write information data to, or read information data from the media. Information data 430 read from media device 101 is stored in device buffer 407 pending transfer to cache 106. In the write cycle, information data 430 is transferred from cache 106 to device buffer 407 to be written to media 101. ATA/IDE HDD controllers 103 using this interface are programmed by the host computer to perform commands and return status to the host at command completion.

Communication to or from HDD media device 101 is through host interface 400 to I/O registers 401 through 410 that route the input or output data to or from registers addressed by the signals from the host:

(CS0_, CS1_, DA[2:0], DIOR_, and DIOW_)

All data written to any of the registers 401 through 410 pass from the host via input 430. Inputs 431 through 433 provide all the control signals described in conjunction with FIGS. 2 and 3.

Control block registers driven by HDD device control 421 and HDD data control 422 are used for device control and to post alternate status. These registers include: write control register 401; alternate status registers 402; and data register 407.

Command block registers are used for sending commands to the device or posting status from the device. These registers include: write command register 403; read status register 404; cylinder high register 405; cylinder low register 406; device/head register 409; error register 412; features register 413; sector count register 410; and sector number register 408.

SUMMARY OF THE INVENTION

This invention is methods and hardware interfacing high speed hard disk drives (ATA-HDD) in high throughput programmable I/O modes to digital media processors (DMP). The prescribed interface programs signals available in the DMP external memory interface (EMIF) functions to match the requirements of ATA-HDD programmable I/O functions. Selected signal redefinition and minimal glue logic forms a seamless link between the EMIF I/O of the digital media processor DMP and the ATA-HDD hard drive.

BRIEF DESCRIPTION OF THE DRAWINGS

These and other aspects of this invention are illustrated in the drawings, in which.

DETAILED DESCRIPTION OF PREFERRED EMBODIMENTS

Figure 5:
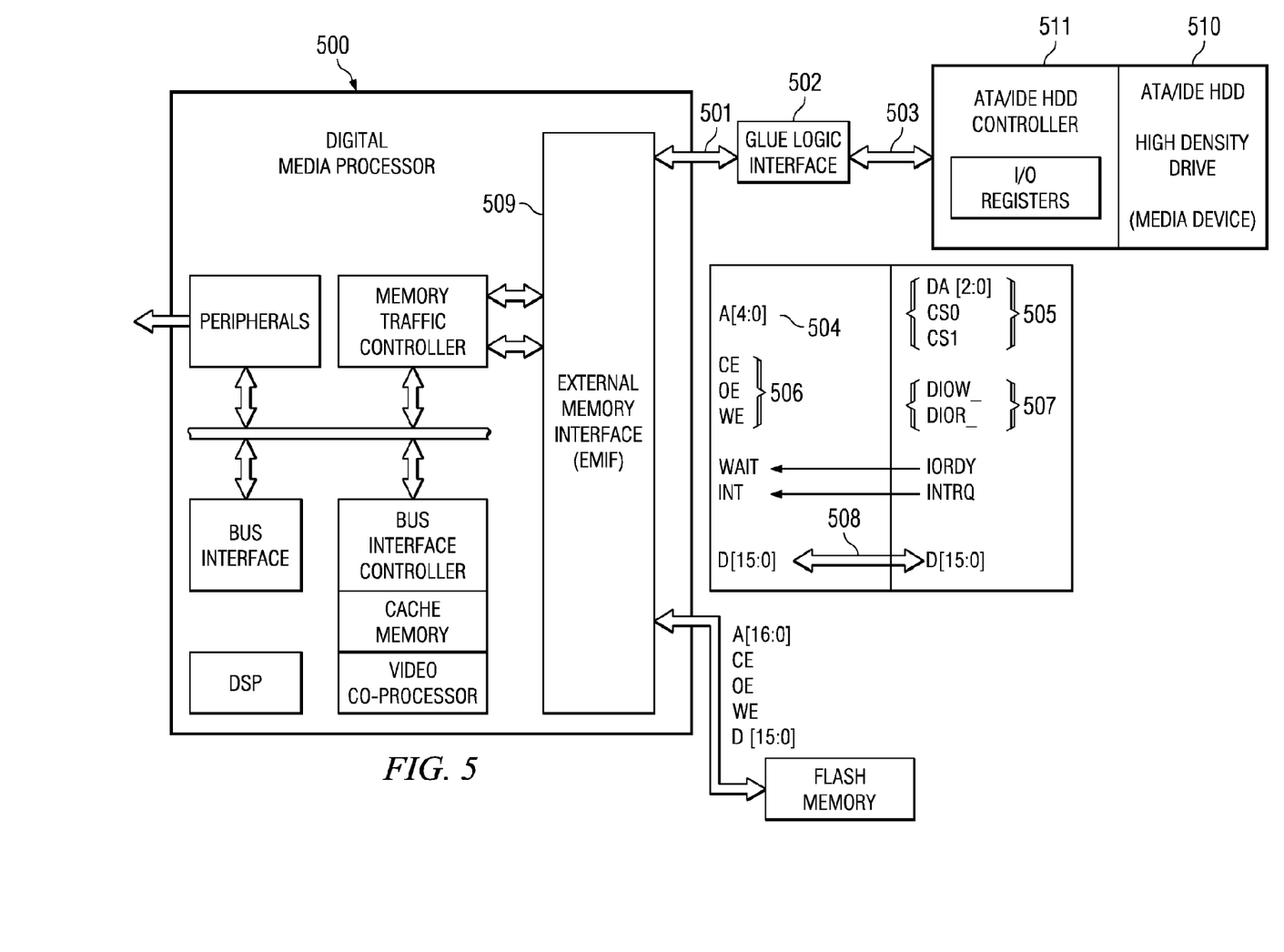
FIG. 5 illustrates the block diagram of a digital media processor (DMP) and EMIF interface to an ATA/HDD high density hard drive via the glue logic of the invention and special EMIF signal programming.

FIG. 5 illustrates the block diagram of a digital media processor (DMP) 500 and its interface to an ATA/IDE high-density hard drive 510 using only the DMP EMIF interface 509 and a set of simple glue logic gates 502. The signals derived from the DMP processor EMIF are adapted and supplemented to secure a seamless interface to the ATA/IDE HDD hard disk drive 510. Signals 501 pass through the glue logic 502 creating the required signals 503 allowing for flexible programming of the interface permitting a very high speed interface between the DMP and the ATA/IDE hard drive. EMIF address bits A[4:0] 504 translate directly to required I/O register address bits 505 including DA[2:0], chip select CS0 and chip select CS1 (see FIG. 7). Glue logic 502 (see FIG. 8) matches signals 506 to signals 507 at the interface. Data bus 508 is a direct pass through.

The ATA/IDE hard drive interface matches ATA/IDE selection addresses with the requirements of the ATA-HDD HDD controller 511 and the I/O port registers illustrated in FIG. 4. These ATA-HDD I/O registers direct the ATA-HDD operation allowing all data and control signals to execute the completion of hard drive media storage.

Figure 6:
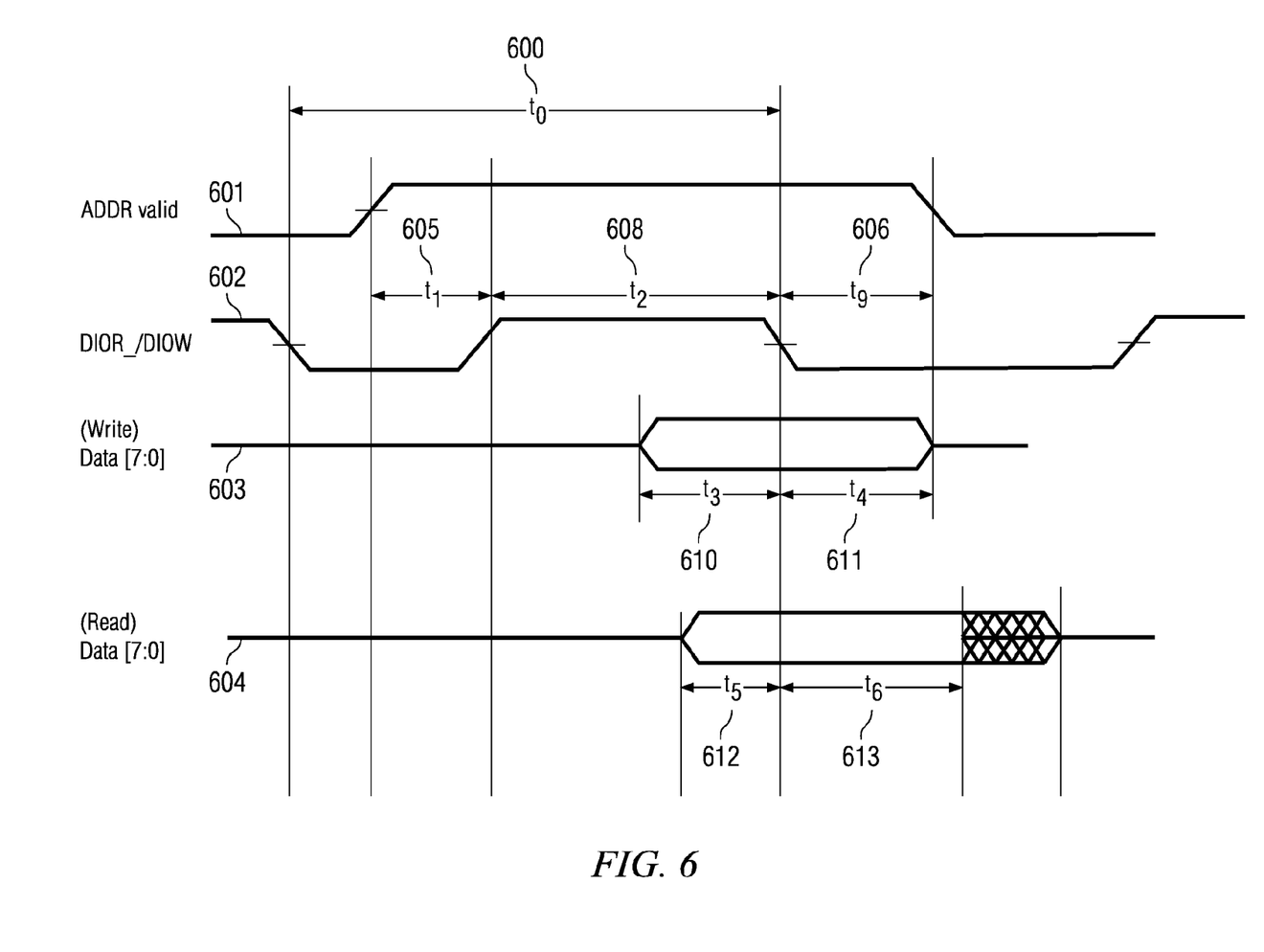
FIG. 6 illustrates the ATA/HDD hard drive signal timing as programmed according to the present invention.

FIG. 6 illustrates the timing of all control and data signals between the EMIF and ATA/IDE hard drive interface. Table 4 lists numerical values for all the timing requirements of parameters described in FIG. 6.

For data read, HDD output data must be held valid on data bus $t_6$ a minimum of 10 nsec after DIOR negates at interval 613.

Figure 7:
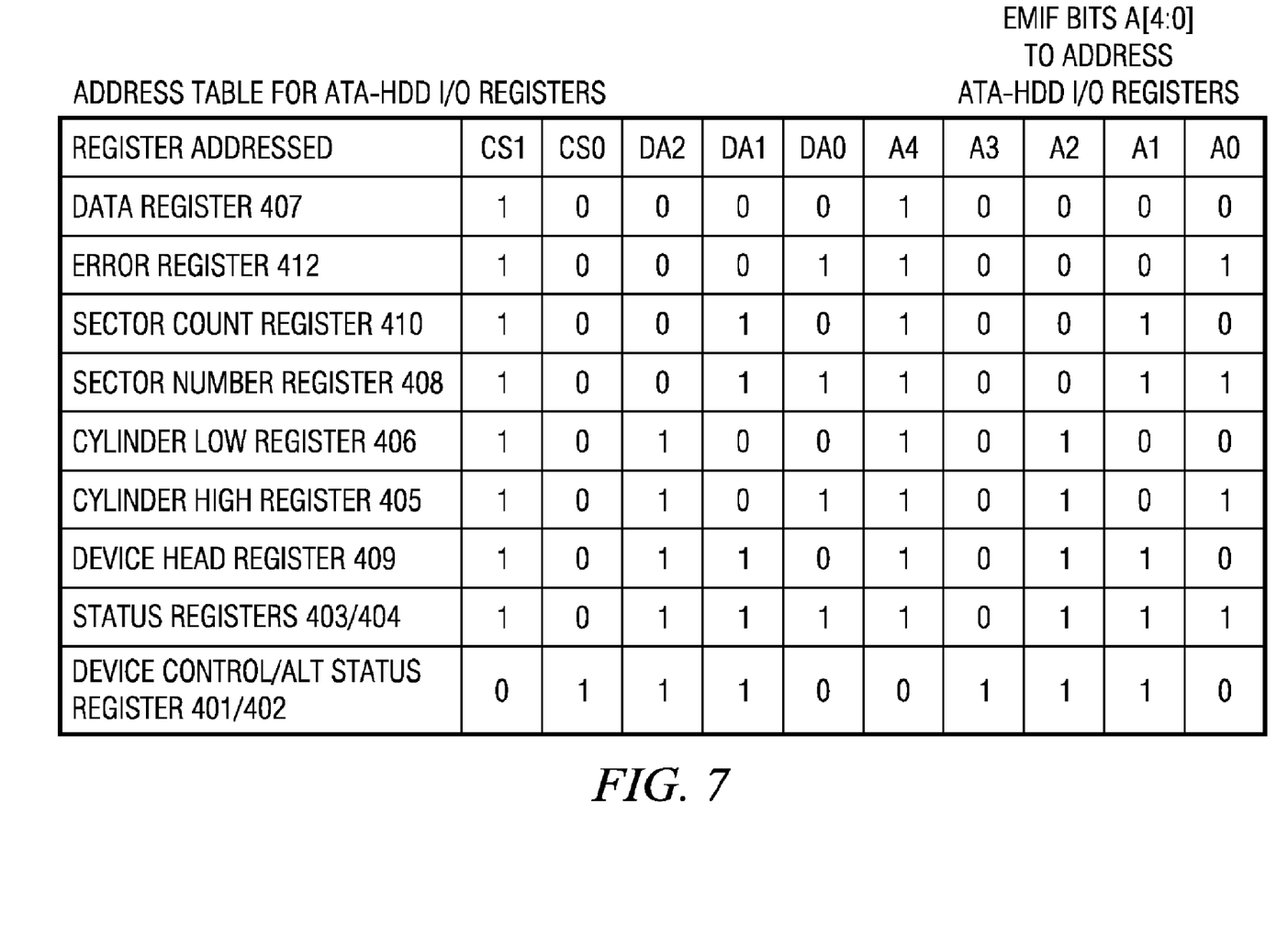
FIG. 7 illustrates the use of EMIF address bits A[4:0] to directly address the ATA-HDD I/O registers of FIG. 4.

FIG. 7 illustrates the use of EMIF address bits A[4:0] to directly address the ATA-HDD I/O registers of FIG. 4. The EMIF bits A[4:0] pass to ATA/IDE hard drive with signals renamed DA[2:0], CS0 and CS1 with no translation required.

Figure 8:
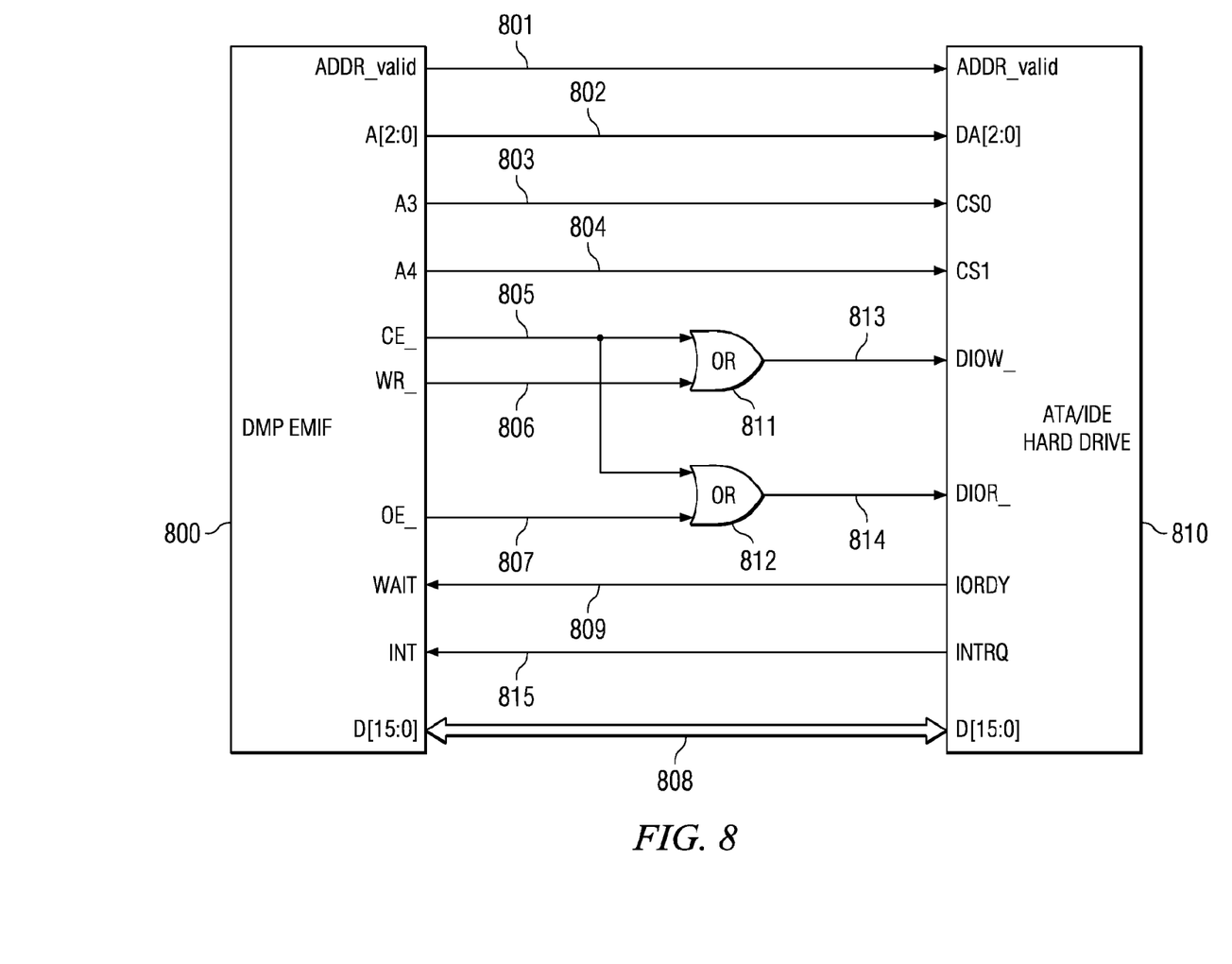
FIG. 8 illustrates the signal connections between the DMP EMIF and the ATA/IDE hard drive via the glue logic of the invention.

FIG. 8 illustrates the signal connections between the DMP EMIF 800 and the ATA/IDE hard drive 810 via the glue logic of this invention. Only two OR gates 811 and 812 are required for the interface and these may be housed conveniently in a flex PC card designed to plug into present DMP processors configured to interface to current hard drives. The signals of the glue interface illustrated in FIG. 8 include:

ADDR_valid 801 defines the time window for which addressing is valid;

A[2:0] 802 is the least significant 3 bits of the address bus from DMP_EMIF which drives DA[2:0] of the ATA/IDE hard drive;

A[3] 803 is bit 3 of the address bus from DMP_EMIF which drives CS0 of the ATA/IDE hard drive;

A[4] 804 is bit 4 of the address bus from DMP_EMIF which drives CS1 of the ATA/IDE hard drive;

CE_ 805 is the chip enable signal for write/read operations which is active low;

WR_ 806 is the write/read signal from DMP_EMIF;

OE_ 807 is the output enable signal from DMP_EMIF;

TABLE 4

| | PIO Timing Parameters | Mode0 nsec | Mode1 nsec | Mode2 nsec | Mode3 nsec | Mode4 nsec |
|---|---|---|---|---|---|---|
| t0 | Cycle Time | 600 | 383 | 240 | 180 | 120 |
| t1 | Address Valid to DIOR_/DIOW_ setup time (min) | 70 | 50 | 30 | 30 | 25 |
| t2 | DIOR_/DIOW_ width (min) | 165 | 125 | 100 | 80 | 70 |
| t2r | DIOR_/DIOW_ recovery time (min) | — | — | — | 70 | 25 |
| t3 | DIOW_ data setup time (min) | 60 | 45 | 30 | 30 | 20 |
| t4 | DIOW_ data hold time (min) | 30 | 20 | 15 | 10 | 10 |
| t5 | DIOR_ data setup time (min) | 50 | 35 | 20 | 20 | 20 |
| t6 | DIOR_ data hold time (min) | 5 | 5 | 5 | 5 | 5 |
| t6z | DIOR_ data release (max) | 30 | 30 | 30 | 30 | 30 |
| tg | DIOR_/DIOW_ to address valid hold time (min) | 20 | 15 | 10 | 10 | 10 |

The highest defined programmable I/O-4 mode data transfer rate requires the following timing:

Access cycle time 600 is a full cycle of DIOR_/DIOW_ illustrated in FIG. 6, $t_0$ is a minimum of 120 nsec for a data transfer rate of 16.6 MBytes/sec;

Address valid to write or read setup time 605 $t_1$ is a minimum of 25 nsec;

Write or read pulse width 608 in DIOR_/DIOW_ 602 $t_2$ is a minimum of 70 nsec;

For data write, EMIF write data 603 must be valid on data bus $t_3$ is a minimum of 20 nsec before DIOW negates at interval 610;

For data write, EMIF write data 603 must be valid on data bus $t_4$ a minimum of 10 nsec after DIOW negates at interval 611;

For data read, HDD output data 604 must be valid on data bus $t_5$ a minimum of 20 nsec before DIOR negates at interval 612; and D[15:0] 808 is the data transfer bus containing the data to be transferred;

WAIT/IORDY 809 is the wait request from ATA/IDE to DMP EMIF;

INT/INTRQ 815 is the interrupt request from ATA/IDE to DMP EMIF;

DIOW_ 813 determines the duration of WRITE cycle and is active low; and

DIOR_ 814 determines duration of READ cycle and is active low.

Figure 9:
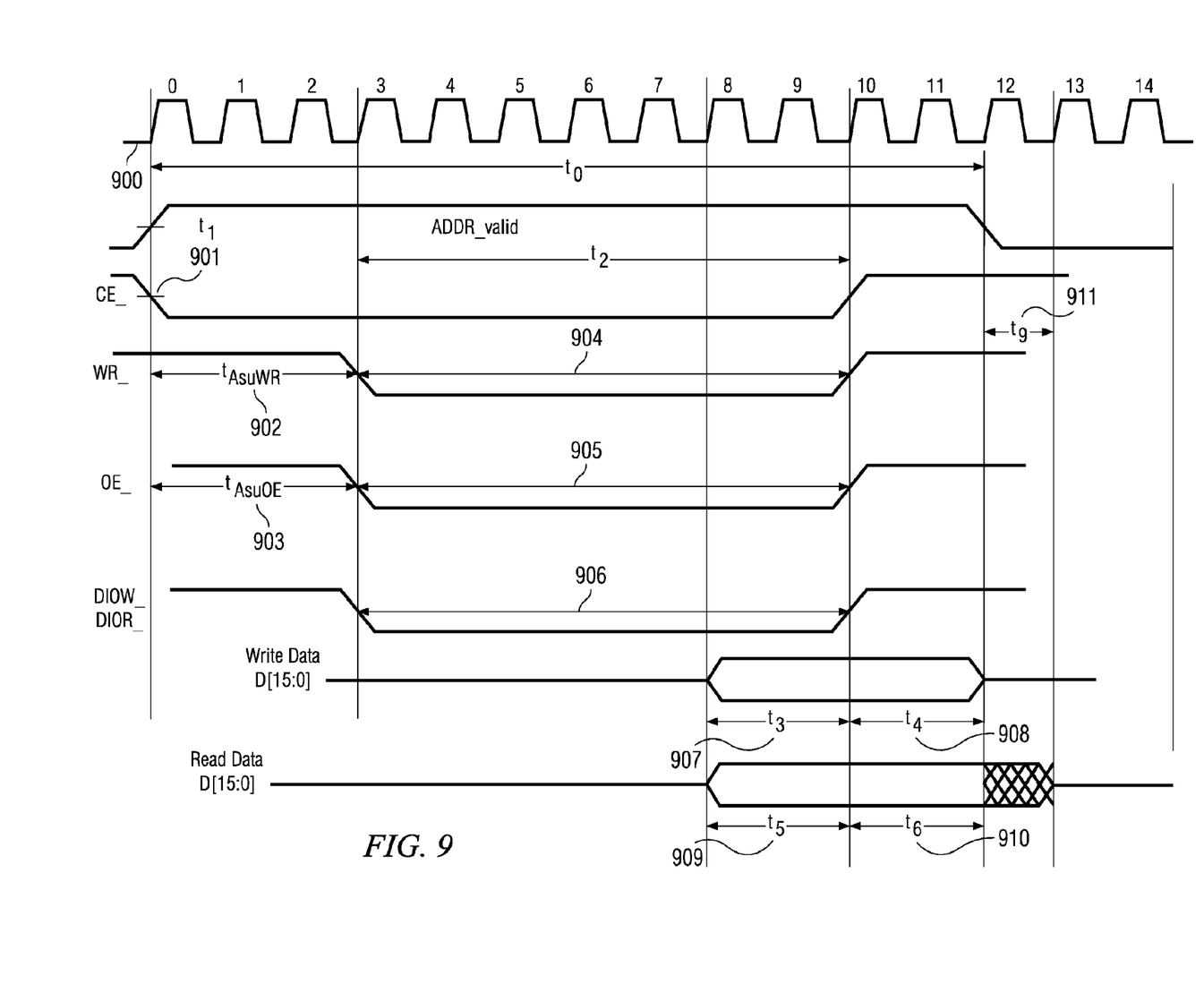
FIG. 9 illustrates a programming example for EMIF timing that allows programmable I/O-4 mode operation according to the technique of the invention.

FIG. 9 illustrates a programming example for EMIF timing that allows programmable I/O-4 mode operation using this invention. Programming of the crucial timing signals between the input and the output signals of the glue logic of FIG. 8 proceeds as follows.

(1) Program CPU clock 900 with 12 cycles so that 12×10 nsec=120 nsec, which meets $t_0$=120 nsec maximum for programmable I/O-4 mode access cycle time.

(2) Program CE setup time 901 $t_1$ with 10 cycles.

(3) Program both WR_ setup time 902 and OE_ setup time 903 with 3 cycles. This makes the address valid setup time equal to 30 nsec, which meets $t_1$ greater than or equal to 25 nsec timing limit for programmable I/O-4 mode timing.

(4) Program both WR_ width 904 and OE_ width 905 with 7 cycles. This makes the read or write pulse width is 7×10=70 nsec, which meets $t_2$=70 nsec requirement for programmable I/O-4 mode for DIOR_ and DIOW_ 906.

(5) The above timing settings leave address valid hold time of 120 nsec−30 nsec−70 nsec=20 nsec. This meets the $t_9$=10 nsec requirement for programmable I/O-4 mode at 911.

(6) For reads from the HDD, the HDD places read data output on the data bus $t_5$=20 nsec before DIOR_ negates, and holds the data valid on the bus for $t_6$=10 nsec after DIOR_ negates as illustrated at 909 and 910.

The EMIF requires only that data to be valid 8 nsec before DIOR_ negates. This requirement is less than $t_5$=20 nsec of this example. The EMIF does require that data be valid immediately following DIOR_ negating. Thus EMIF read operation timing meets HDD programmable I/O-4 mode read timing requirements.

(7) For writes to the HDD, the HDD programmable I/O-4 mode expects data to be valid $t_3$=20 nsec before DIOW_ negates and held valid for $t_4$=10 nsec after DIOW_ negates as illustrated at 907 and 908. EMIF places D[15-0] on the data bus when the address and CE are valid. Thus, the EMIF data is valid during both $t_3$ and $t_4$ for HDD to clock data in. Thus, write operation timing is satisfied.

The above timing check illustrates that the programmed EMIF timing after the glue logic meets ATA-programmable I/O-4 mode timing requirements. Therefore, it supports data write and data read at programmable I/O-4 mode speed where 2 bytes are processed every 120 nsec or 16.7 MBytes/second.

Compared to CFC interface to access HDD, the CFC access rate is limited by 290 nsec for each read or write operation. This happens where 290 nsec=70 nsec address setup time÷165 nsec read/write pulse width÷20 nsec address hold time plus 35 nsec for a 16-bit read/write operation. This means when using CFC interface to HDD, the system could not sustain programmable I/O-2 mode operation which requires 240 ns access rate.

What is claimed is:

1. A digital device comprising:
   a digital media player having a programmable external memory interface, said programmable external memory interface including:
      an address valid output line,
      five address bit output lines,
      a chip enable output line,
      a write/read output line,
      an output enable output line,
      a wait request input line,
      an interrupt input line, and
      a plurality of data lines;
   a first OR gate having a first input connected to said chip enable output line, a second input connected to write/read output line and an output;
   a second OR gate having a first input connected to said chip enable output line, a second input connected to said output enable output line and an output;
   an Advanced Technology Attachment/Integrated Drive Electronics (ATA/IDE) hard drive including:
      an address valid input line connected to said address valid output line,
      three address input lines connected to corresponding ones of three least significant bits of said address output lines,
      a first chip select input line connected to a next most significant one of said address output lines,
      a second chip select input line connected to a most significant one of said address output lines,
      a write duration input signal line connected to said output of said first OR gate,
      a read duration input signal line connected to said output of said second OR gate,
      a wait request output line connected to said wait request input line,
      an interrupt output line connected to said interrupt input line, and
      a plurality of data lines, each data line connected to a corresponding data line of said external memory interface.

2. The digital device of claim 1, wherein:
   said ATA/IDE hard drive is operable in a selected one of a plurality of operating modes having corresponding rates of operation; and
   said digital media player programs said programmable external memory interface to supply signals to said ATA/IDE hard drive corresponding to said selected operating mode.

3. The digital device of claim 2, wherein:
   said ATA/IDE hard drive is operable in a programmable I/O-4 mode having a rate of operation of 16.6 Mbytes/second; and
   said digital media player programs said programmable external memory interface for read operation to
      supply a high output at said address valid output line for 120 nsec,
      supply a low output at said chip enable output line having a duration of 100 nsec,
      supply a high output at said write/read output line and a high output at said output enable output for a duration of 30 nsec,
      supply a low output at said write/read output line and a low output at said output enable output line for a duration of 70 nsec,
      supply valid address signals on said plurality of address output lines for at least 20 nsec before an end of said supply of said low output at said write/read output line and said low output at said output enable output line until at least 10 nsec after an end of said supply of said low output at said write/read output line and said low output at said output enable output line, and
      receive data on said data lines before said end of said supply of said low output at said write/read output line and said low output at said output enable output line.

4. The digital device of claim 2, wherein:
   said ATA/IDE hard drive is operable in a programmable IO-4 mode having a rate of operation of 16.6 Mbytes/second; and
   said digital media player programs said programmable external memory interface for write operation to
      supply a high output at said address valid output line for 120 nsec,
      supply a low output at said chip enable output line having a duration of 100 nsec,
      supply a high output at said write/read output line and a high output at said output enable output for a duration of 30 nsec,
      supply a low output at said write/read output line and a low output at said output enable output line for a duration of 70 nsec,
      supply valid address signals on said plurality of address output lines for at least 20 nsec before an end of said supply of said low output at said write/read output line and said low output at said output enable output line until at least 10 nsec after an end of said supply of said low output at said write/read output line and said low output at said output enable output line, and supply data on said data lines from at least 20 nsec before an end of said supply of said low output at said write/read output line and said low output at said output enable output line until at least 10 nsec after an end of said supply of said low output at said write/read output line and said low output at said output enable output line.

\* \* \* \* \*